United States Patent [19]
Martin

[11] Patent Number: 5,628,877
[45] Date of Patent: May 13, 1997

[54] METHOD AND DEVICE FOR PRODUCING A SOLID FUEL FROM COMBUSTIBLE WASTE

[75] Inventor: Gérard Martin, Rueil Malmaison, France

[73] Assignee: Institut Francais du Petrole, Rueil Malmaison, France

[21] Appl. No.: 458,774

[22] Filed: Jun. 2, 1995

Related U.S. Application Data

[63] Continuation of Ser. No. 789,013, Nov. 7, 1991.

[30] Foreign Application Priority Data

Nov. 7, 1990 [FR] France ..................... 90 13844

[51] Int. Cl.$^6$ .......................................... C10B 53/08
[52] U.S. Cl. ....................... 201/7; 201/3; 201/21; 201/33; 202/100; 202/131; 585/240
[58] Field of Search ..................... 201/2.5, 3, 12, 201/20, 21, 25, 33, 7; 202/100, 131, 136; 423/230, 240, 244; 585/240

[56] References Cited

U.S. PATENT DOCUMENTS

| | | | |
|---|---|---|---|
| 4,235,676 | 11/1980 | Chambers | 201/25 |
| 4,303,477 | 12/1981 | Schmidt et al. | 201/20 |
| 4,308,103 | 12/1981 | Rotter | 201/25 |

*Primary Examiner*—Christopher Kim
*Attorney, Agent, or Firm*—Antonelli, Terry, Stout & Kraus, LLP

[57] ABSTRACT

A method for producing a solid fuel from combustible waste includes sorting and grinding the waste, treating the waste by heating in the absence of oxygen in a first pyrolysis reactor and then collecting the waste so treated. Polluting elements in the gases emerging from the pyrolysis are removed while the gases are hot before being directly reused to heat a first pyrolysis reactor so that solids leaving the pyrolysis operation provide a fuel without the pollutants initially contained in the waste. The device for carrying out this method includes a pyrolysis reactor and a unit for supplying an absorbent to a zone wherein the gases generated by pyrolysis are contacted by the absorbent to remove the polluting elements; the absorbent and the decontaminated solids are separated from each other.

7 Claims, 3 Drawing Sheets

METHOD AND DEVICE FOR PRODUCING A SOLID FUEL FROM COMBUSTIBLE WASTE

This is a continuation of application Ser. No. 07/789,013, filed Nov. 7, 1991

BACKGROUND OF THE INVENTION

The present invention relates to production of solid fuel from combustible waste such as, for example, industrial and household waste.

More specifically, the invention relates to waste treatment that eliminates various pollutants by a dry method, i.e. without washing or wet treatment.

In general, in all industrial waste treatment operations, the pollutant elimination stage, if any, is accomplished by a wet method, which involves considerable facilities and operating costs.

One example of a device for treating materials containing hydrocarbons by pyrolysis is given in document U.S. Pat. No. 4,743,341. A "dry" decontamination operation takes place during pyrolysis, due in particular to a fluidized bed placed between the zone in which the gases are burning and the upper clean-gas evacuation zone.

Also, U.S. Pat. No. 4,303,477 proposes using, at various points in a waste treatment circuit, a basic powder to eliminate the heavy metals, sulfurous acid, or halogens from the combustion gases of a furnace treating waste.

SUMMARY OF THE INVENTION

The goal of the invention is to furnish a method allowing treatment of industrial and/or household waste in which most of the pollutants are eliminated by a dry method, calling on means that are as simple as possible in both their constitution and in their utilization.

Another advantage of the invention consists of energy valorization of the waste by recycling the energy, for example in the coke form, which is thus not released into the atmosphere without being put to use. Of course, the absence of "aggressive" components or pollutants in the fuel produced facilitates combination and limits reactor maintenance costs.

To achieve the advantages which have just been listed, the method according to the invention consists of drying waste that has already undergone at least one grinding step and a first sorting step, treating the waste in a first pyrolysis reactor by heating in the absence of oxygen, and collecting the waste thus treated. Thus, the polluting elements have been removed from all or part of the gas leaving said heating operation before it is reused to heat said first pyrolysis reactor.

According to the invention, the solids emerging from the heating operation consist in particular of a fuel free of the main pollutants initially contained in the waste. This can be achieved by trapping the pollutants in a single reactor zone and evacuating the spent absorbent and the decontaminated fuel separately.

In particular, said solids leaving the first pyrolysis reactor are cooled before being stored in storage means.

According to one of the embodiments of the invention, the pollutant gases are trapped by an absorbent in a zone located inside the first pyrolysis reactor.

According to another embodiment of the invention, the polluting gases are extracted from the pyrolysis gases in a device located outside said first pyrolysis reactor.

The zone inside the first pyrolysis reactor is for example located at the outlet of the pyrolysis gases and a second reactor participates in trapping the pollutant gases.

According to another of its aspects, the goal of the invention is to furnish a device designed to implement the method defined above.

The device comprises at least one first pyrolysis reactor, a means for storing the fuel produced by the first reactor, and means intended to bring the waste to the pyrolysis reactor.

The device also has means designed for hot extraction of the pollutants produced in the pyrolysis gases and means allowing the pyrolysis gases so treated to be conducted to the pyrolysis reactor for heating purposes.

According to the invention, the facility (or device) also has means designed to evacuate the spent absorbent and the solid fuel separately; in addition, means designed to hot-extract the pollutants are located in a single specific zone of the facility.

According to another characteristic, the device has an element for cooling the solid fuel emerging from said first pyrolysis reactor.

According to an additional characteristic of the invention, the pollutant extraction means consists of a second reactor to which the gases leaving the pyrolysis reactor are directed, said second reactor also being supplied with absorbent material by a specific device, and comprising means for evacuating the spent absorbent.

The pyrolysis reactor can be heated by burners located near the rotating furnace, the burners being supplied by decontaminated pyrolysis gases, or by heat-carrying elements, for example mixed with the absorbing elements, and directed toward the pyrolysis reactor.

BRIEF DESCRIPTION OF THE DRAWINGS

Other characteristics and advantages of the present invention will emerge from the following description, provided indicatively but not limitatively, with reference to the attached drawings wherein.

DETAILED DESCRIPTION OF THE INVENTION

Figure 1:
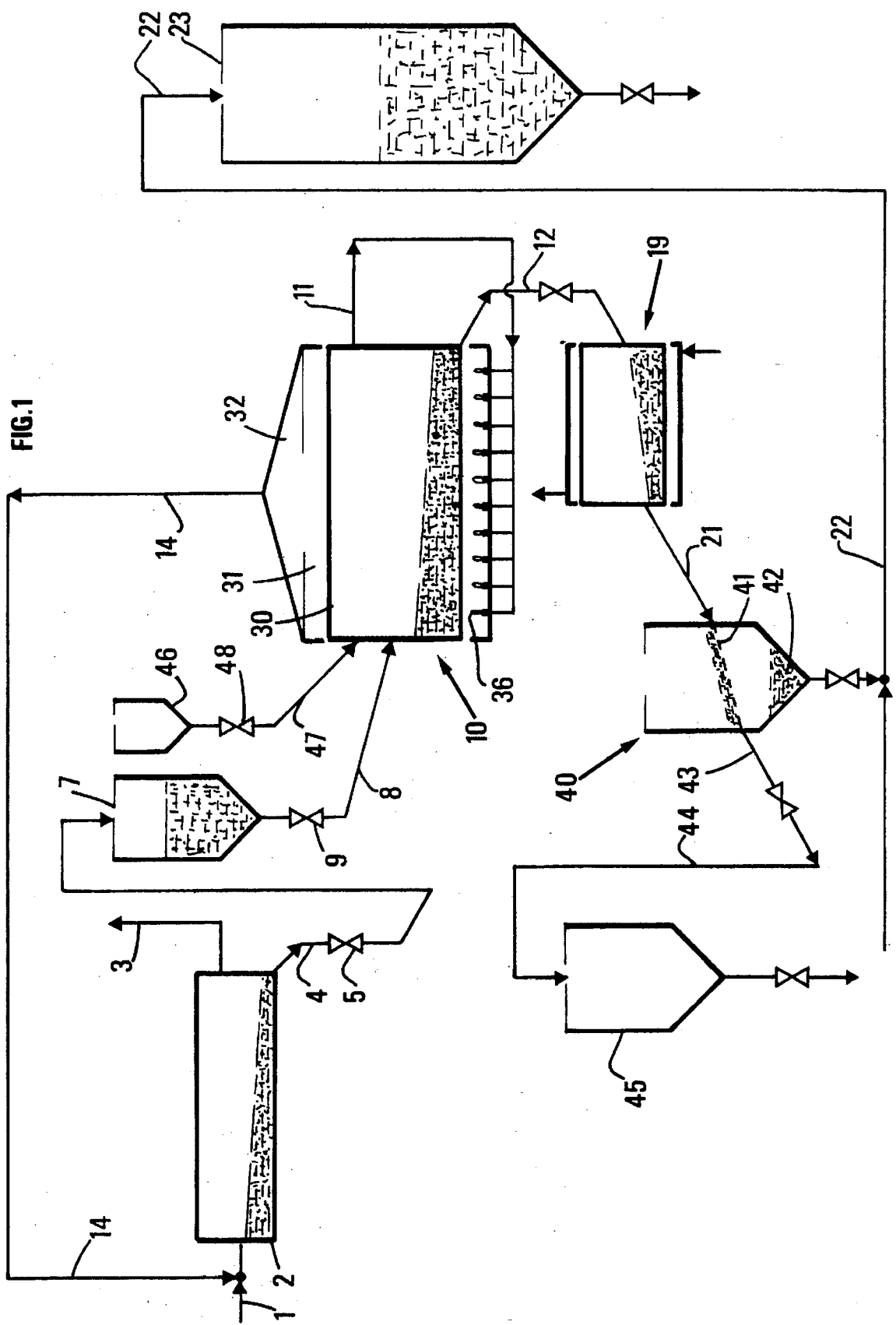
FIG. 1 represents a general diagram of one embodiment of the invention.

FIG. 1 shows schematically a device according to a first embodiment of the invention which has an incoming waste line 1. The waste can be brought to a dryer 2 which can be a rotating furnace. A stream of hot gases brought by a pipe 14 and coming from a pyrolysis furnace 10 (described below) terminates just upstream of dryer 2, allowing hot gases to be mixed with the waste in the dryer.

The steam produced in dryer 2 is eliminated through a pipe 3 while the solids are evacuated through another pipe 4 equipped with a control valve 5. The waste then passes into a hopper 7 before arriving at pyrolysis reactor 10 via a pipe 8. A control valve 9 is preferably provided on pipe 8 between hopper 7 and pyrolysis reactor 10 to regulate the waste flow feeding into the latter.

Pyrolysis reactor 10 is preferably a rotating furnace comprised of a sealed, cylindrical internal metal jacket 30, at least one burner 36 located near said metal jacket to heat it. The burner or burners is/are mounted in a generally sealed annular container 31 located between metal jacket 30 and the outer wall of reactor 10. Burner or burners 36 is/are supplied with fuel by a common inlet 11 described below. A dome-shaped collector 32, made from container 31, is also provided to channel the hot gases created by burners 36 into container 31. A pipe (or line) 14 begins at the top of collector 32 and terminates upstream of dryer 2 to allow this stream of hot gases to mix with the waste in dryer 2, as stated above.

Two other transverse outlets are provided in reactor 10: one, 11, leaves the center or the upper part of metal jacket 30 and is intended to carry the pyrolysis gases, the other 12, located at the lower part, is intended to evacuate the solid coming from pyrolysis, which is then cooled in a specific device 19, comprised for example of a cylinder cooled by a stream of water. Any device performing this function is of course conceivable without departing from the framework of the invention.

The absorbent element is injected from a storage hopper 46 into metal jacket 30, near the waste inlet. The absorbent element is advantageously in the form of particles with a substantially larger diameter than that of the fuel produced by pyrolysis.

The absorbent particles are mixed with the waste and migrate with it substantially along the length of rotating cylinder 30 so that the pollutants are trapped in reactor 10 as soon as they are released.

The mixture of solids ("decontaminated" fuel and absorbent) is then evacuated by line 12, cooled in device 19, then carried by a pipe 21 before passing through a device 40 intended to extract the absorbent from the fuel produced.

Device 40 can for example be a vibrating screen composed of a grid 41 and an intermediate storage zone 42 into which falls the separated fuel which can then be sent through a pipe 22 to final storage silo 23. The absorbent itself is evacuated by another pipe 43 which brings it for example to a storage hopper 45.

Pyrolysis of the waste takes place between 200° and 1500° C., preferably between 400° and 600° C.

The residence of time of the waste varies according to the desired flowrate and/or consistency of the waste, between 0.5 and 100 minutes.

For certain types of waste, the stage prior to drying may be eliminated. In this case, the waste is sent directly to pyrolysis reactor 10 and the hot fumes recovered in collector 32 are used for example to produce steam or hot water in a boiler.

Figure 2:
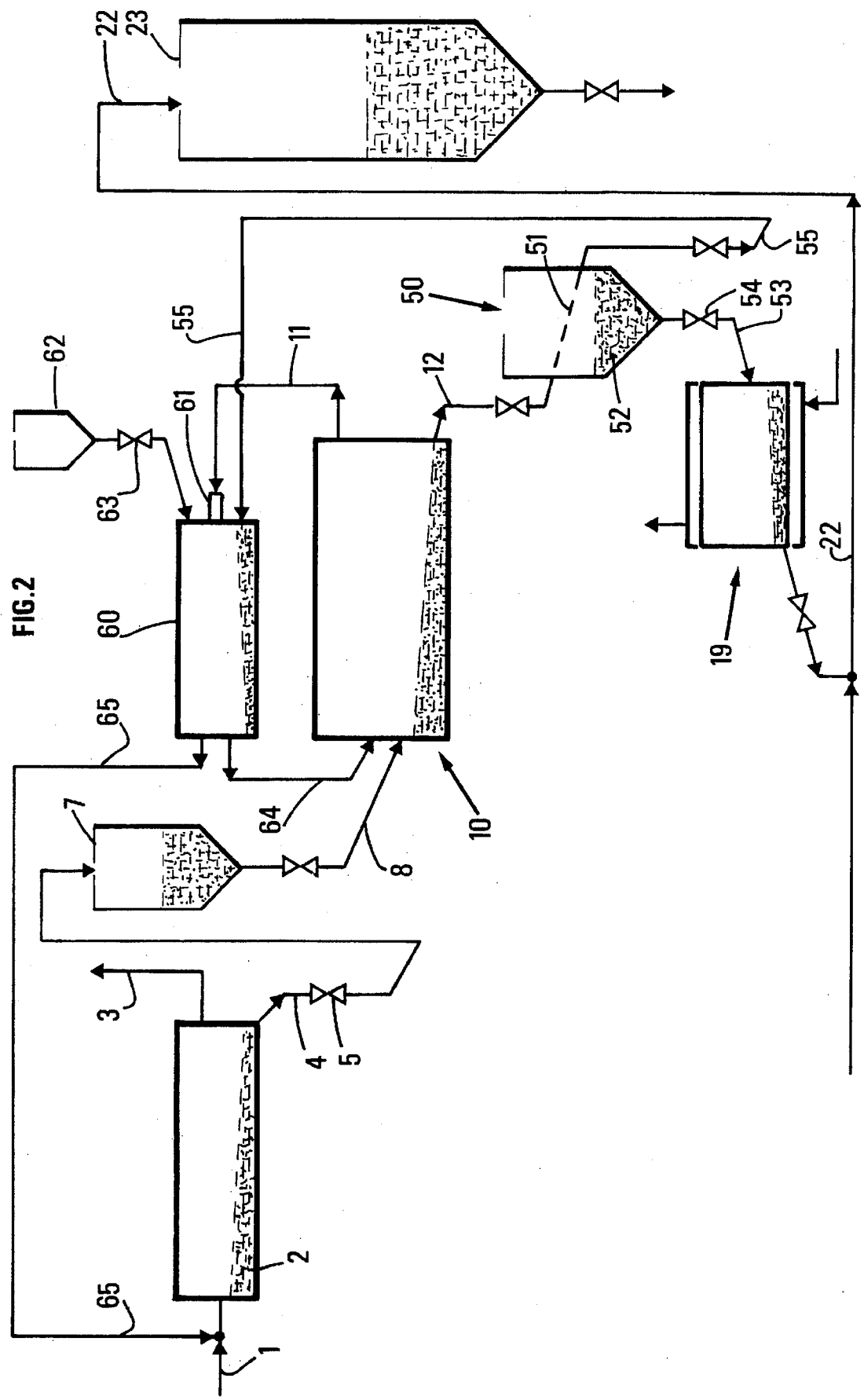
FIG. 2 relates to a diagram of a facility according to another embodiment of the invention.

FIG. 2 shows another embodiment of the invention which differs from the first only by the method of heating pyrolysis reactor 10. Heating of the elements located in reactor 10 is accomplished by injection of heat-carrying solids brought by a pipe 64. After recovery downstream of pyrolysis reactor 10, the heat-carrying solids are reheated in a reheating reactor 60. Preferably, the heat carrier will serve to support an absorbent. The heat carrier which, in this case, also plays the role of absorbent, is renewed from storage hopper 62. A valve 63 or any flowrate regulation element can also be provided on the pipe (not shown) intended to bring the heat carrier emerging from storage hopper 62 to reheating reactor 60. A heating element such as a burner 61 produces direct reheating near the heat carrier in second reactor 60. This arrangement is not limiting, however, and external heating of reactor 60 is thus conceivable.

Burner 61 is supplied with pyrolysis gas by outlet pipe 11. A pipe 65 bringing hot fumes from second reactor 60 can be provided in order to send these hot gases just upstream of dryer 2.

The heat carriers, which here play the role of pollutant absorbent, are thus heated in second reactor 60, then injected by pipe 64 into pyrolysis reactor 10, where they are mixed with the waste to be treated. The decontaminated coke, or solid fuel, leaves first pyrolysis reactor 10 through pipe 12 while the pyrolysis gases are evacuated by pipe 11 which supplies burner 61 of second reactor 60.

The coke and heat carriers are separated at the outlet of pyrolysis reactor 10 in an appropriate means such as for example a vibrating screen 50 composed of a grid 51 and an intermediate storage cone 52. The coke is then directed by a pipe 53 to a cooler 19 as already described. A valve 54 can be provided in pipe 53. The heat carrier is directed by a pipe 55 to second reactor 60 when the spent absorbent has been removed from it.

The heat carrier can be comprised of raw absorbent or serve as a support for the absorbent which is then regularly impregnated.

In the embodiment of FIG. 2, the fumes produced by burner 61 circulate countercurrent-wise with the heat-carrying solids in reactor 60, but countercurrent operation of reactor 60 can also be envisaged.

Figure 3:
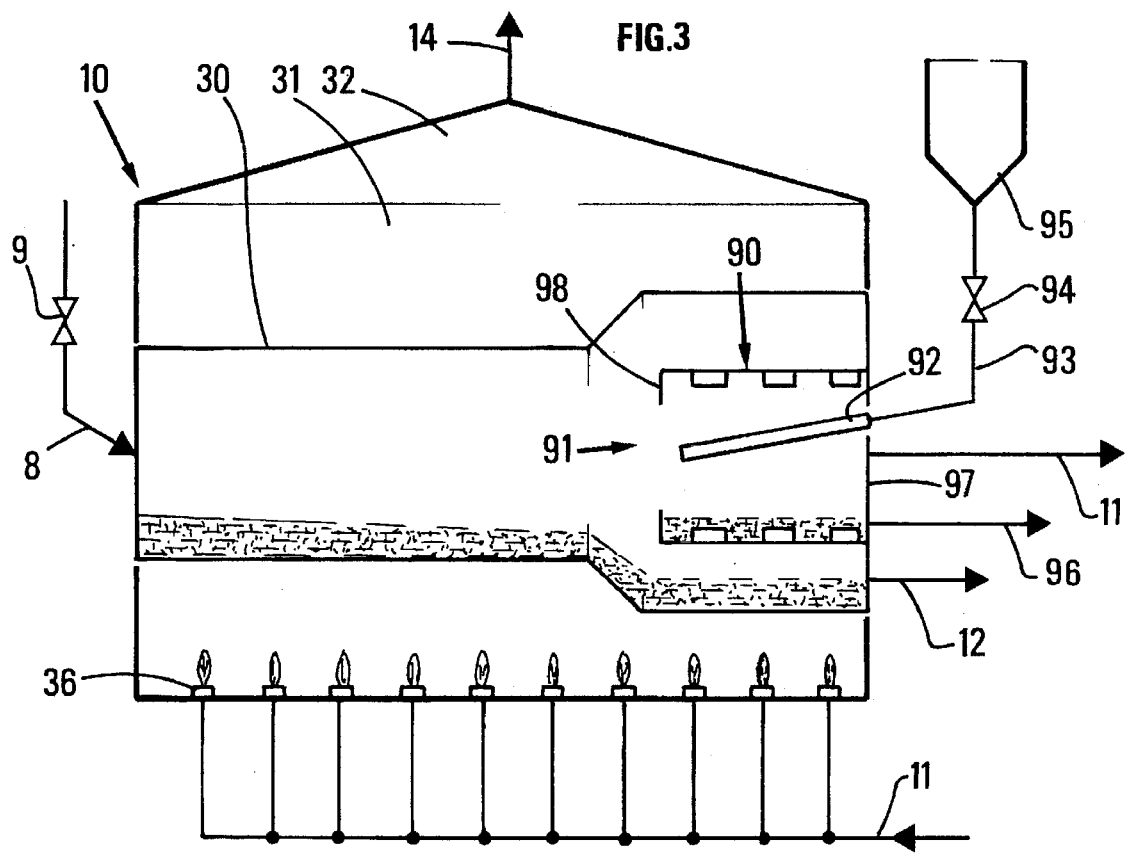
FIG. 3 is a simplified diagram of a pyrolysis reactor used in the device according to the invention.

Another embodiment of the invention will now be described in relation to FIG. 3 which illustrates a pyrolysis reactor 10, somewhat modified since it traps pollutants right inside metal jacket 30.

For this purpose, rotating cylinder 30 has, in the pyrolysis gas evacuation zone, a second rotating cylinder 90, preferably coaxial [with] and fully contained in first rotating cylinder 30. This second cylinder 90 communicates with first cylinder 30 by an opening 91 in its bottom located inside cylinder 30, through which opening 91 pass the pyrolysis gases that have already resided in first rotating cylinder 30.

The absorbent arrives at bottom 97, opposite bottom 91, by any system known of itself. An absorbent storage silo 95 connected to a pipe 93 extended by a tube 92 can for example constitute the absorbent-supply device of second rotating cylinder 90. Other spray devices can also be envisaged. The absorbent flowrate is preferably controlled by a valve such as 94 located on supply pipe 93. Shoulder 98 formed at the inner end of second cylinder 90 is designed to retain the absorbent and prevent any mixing with the waste and fuel leaving the first pyrolysis reactor. Two outlets are provided in bottom 97 of second rotating cylinder 90. One, 11, for the decontaminated pyrolysis gases, which, as in all the embodiments described above, directs these gases to burners 36 of reactor 10; the second outlet 96 is designed for the spent absorbent which can for example be stored in a hopper or partially recycled.

Figure 4:
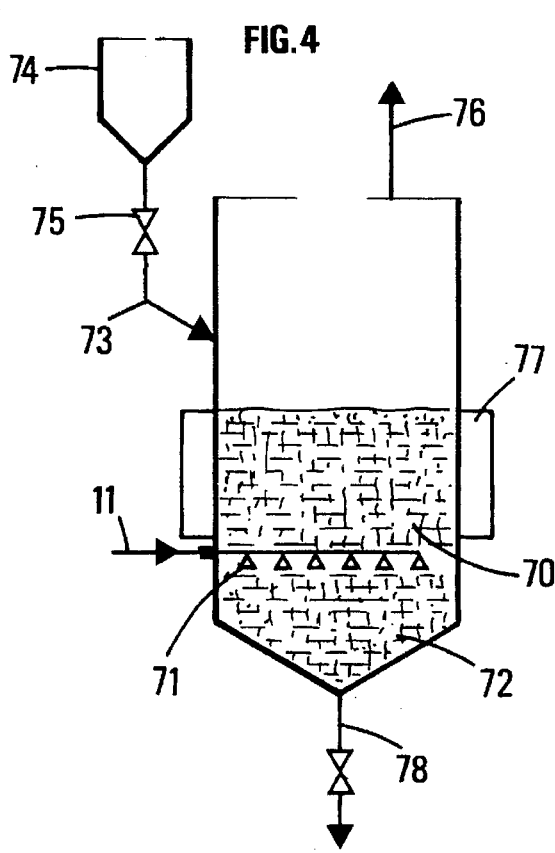
FIGS. 4 and 5 show, in cross section, two devices for trapping pollutants usable in the facility according to the invention.
Figure 5:
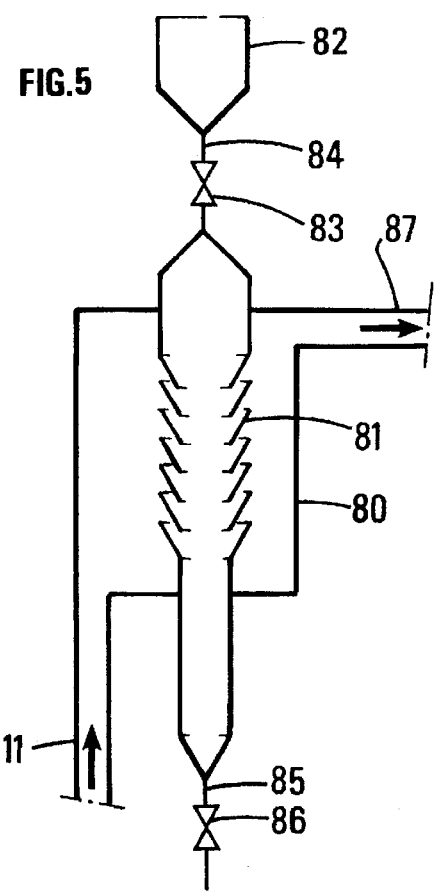

Without departing from the framework of the invention, the specific device designed to trap the pollutants can comprise a movable absorbent bed shown in FIG. 4, or a fluidized bed such as shown in FIG. 5.

In the case of FIG. 5, the pollutants are trapped on a mobile absorbent bed. Reactor 80 which ensures contact between the pyrolysis gases and the absorbent, has two panels of the venetian blind type 81, between which the absorbent circulates. The absorbent flows by gravity from fresh-product storage silo 82, through feed line 84, to evacuation line 85. These two lines are equipped with valves 83 and 86. The gases from which the pollutants have been removed are sent to the burners of the pyrolysis furnace by line 87.

In the case of FIG. 4, the gases are treated in a fluidized bed 70. The gases carried by line 21 are introduced at the base of the bed in distribution tubes 71. The fresh absorbent leaves hopper 74 and is brought by line 73 equipped with valve 75. The spent absorbent is evacuated from the bottom of fluidized bed 72 by line 78. The gases, from which their polluting materials have been removed, are sent to the burners of the pyrolysis furnace by line 76. When it is desired to avoid condensation of certain hydrocarbon materials on the absorbent, the fluidized bed can be equipped with an external heating device 77.

Of course, from the method and device just described simply for illustration and not limitatively, the individual skilled in the art will be able to devise a number of variants and modifications which do not depart from the framework of the invention.

I claim:

1. A method for producing a solid fuel from combustible solid waste containing pollutants, which comprises the steps of treating the combustible solid waste in an apparatus including a first pyrolysis reactor by heating the waste in the absence of oxygen in the first pyrolysis reactor to generate pyrolysis gases containing the pollutants, removing the pollutants while hot at temperatures between 200° and 1500° from at least a part of the pyrolysis gases generated during pyrolysis by contacting the pyrolysis gases with an absorbent during migration of the absorbent during travel along a length of the first pyrolysis reactor so that the pollutants are extracted by the absorbent as soon as the pyrolysis gases are generated from the solid waste, employing the pyrolysis gases free of pollutants to heat said first pyrolysis reactor and in order to produce a solid fuel free of the pollutants initially contained in the waste, the step of removing the pollutants is effected in a single specific zone of the apparatus for contacting the pyrolysis gases with the absorbent, and discharging a mixture of the absorbent containing the pollutants and the decontaminated waste as solid fuel from the first pyrolysis reactor separately from the pyrolysis gases, said solid waste and said absorbent being admixed within said single specific zone located in the first pyrolysis reactor.

2. A method according to claim 1, also comprising a step of drying the waste before heating the waste in the absence of oxygen in the first pyrolysis reactor.

3. A method according to claim 1, further comprising a step of directing combustion gases generated by burning of the pyrolysis gases discharged from the first pyrolysis reactor to heat the first pyrolysis reactor and then using these combustion gases to predry the waste prior to the waste entering the pyrolysis reactor.

4. A method according to claim 1, further comprising a step of introducing the combustible solid waste containing pollutants into the single specific zone of said first pyrolysis reactor, and a step of introducing the absorbent into said zone; the pollutants being essentially composed of chlorine, fluorine, sulfur, their associated acids and heavy metals.

5. A device for production of a solid fuel from combustible solid waste, said device comprising at least one pyrolysis reactor, means for transfering the waste to said at least one pyrolysis reactor, means for heating the at least one pyrolysis reactor to generate pyrolysis gases containing pollutants present in said solid waste, an absorbent for effecting hot extraction of the pollutants by contacting pyrolysis gases in said at least one pyrolysis reactor, means for directing the pyrolysis gases decontaminated by contact with the absorbent to said means for heating said at least one pyrolysis reactor, means for discharging the absorbent containing said pollutants and the decontaminated waste as a solid fuel from the reactor separately from the pyrolysis gases, said absorbent for effecting hot extraction of the pollutants being located in a single specific zone of the device and means for injecting the absorbent into the single specific zone of the device, said zone being located in said first pyrolysis reactor whereby a mixture of absorbent and solid waste is formed within said first pyrolysis reactor, and means for causing said mixture to migrate from one end to the other end of the first pyrolysis reactor whereby pollutants in the pyrolysis gases are immediately extracted by the absorbent as soon as the pyrolysis gases are generated.

6. A device according to claim 5, also comprising a device (19) for cooling the solid fuel leaving said first pyrolysis reactor.

7. A device according to claim 6, wherein said means for heating the pyrolysis reactor comprise burners arranged below the first pyrolysis reactor to heat the first pyrolysis reactor.

* * * * *